United States Patent
Bolms et al.

(10) Patent No.: US 6,612,806 B1
(45) Date of Patent: Sep. 2, 2003

(54) TURBO-ENGINE WITH AN ARRAY OF WALL ELEMENTS THAT CAN BE COOLED AND METHOD FOR COOLING AN ARRAY OF WALL ELEMENTS

(75) Inventors: Hans-Thomas Bolms, Mülheim A. D. Ruhr (DE); Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/937,594

(22) PCT Filed: Mar. 16, 2000

(86) PCT No.: PCT/EP00/02348

§ 371 (c)(1),
(2), (4) Date: Sep. 28, 2001

(87) PCT Pub. No.: WO00/60219

PCT Pub. Date: Oct. 12, 2000

(30) Foreign Application Priority Data

Mar. 30, 1999 (EP) .............................................. 99106492

(51) Int. Cl.[7] ................................................ F01D 5/00

(52) U.S. Cl. ........................................ 415/115; 415/175

(58) Field of Search ................................. 415/115, 116, 415/175, 176, 177, 178, 1; 416/97 R

(56) References Cited

U.S. PATENT DOCUMENTS

| 4,177,004 A | 12/1979 | Bobo et al. |
|---|---|---|
| 4,573,865 A | 3/1986 | Hsia et al. |
| 4,642,024 A | 2/1987 | Weidner |

FOREIGN PATENT DOCUMENTS

| DE | 42 44 303 A1 | 12/1992 |
|---|---|---|
| DE | A4244303 | 6/1994 |
| DE | 197 33 148 C1 | 7/1997 |
| EP | 0 690 205 A1 | 5/1995 |
| EP | A690205 | 1/1996 |

*Primary Examiner*—Edward K. Look
*Assistant Examiner*—Kimya N McCoy
(74) *Attorney, Agent, or Firm*—Harness, Dickey & Pierce, P.L.C.

(57) ABSTRACT

A turbomachine includes a coolable arrangement, having a first wall element and having a second wall element. Coolant is used to cool the arrangement in a turbomachine. After the impingement cooling of the first wall element, the coolant is further used for cooling the second wall element.

49 Claims, 3 Drawing Sheets

TURBO-ENGINE WITH AN ARRAY OF WALL ELEMENTS THAT CAN BE COOLED AND METHOD FOR COOLING AN ARRAY OF WALL ELEMENTS

This application is the national phase under 35 U.S.C. §371 of PCT International Application No. PCT/EP00/02348 which has an International filing date of Mar. 16, 2000, which designated the United States of America, the entire contents of which are hereby incorporated by reference.

FIELD OF THE INVENTION

The invention relates to a turbomachine with a coolable arrangement, having a first wall element and having a second wall element. In addition, the invention relates to a method of using a coolant to cool an arrangement in a turbomachine, having a first wall element and having a second wall element, which bounds the first wall element.

BACKGROUND OF THE INVENTION

In a turbomachine, for example in a gas turbine, useful work is recovered from a flow of hot working fluid, for example hot gas, as a result of its expansion. With a view to increasing the efficiency of a turbomachine, attempts are made inter alia to achieve the highest possible temperature of the hot working fluid. The components directly subjected to the hot working fluid are therefore subjected to very severe thermal effects. In the case of a gas turbine, this affects, for example, the turbine blading (guide blades and rotor blades) and the turbine wall elements which bound the space with the flow of hot working fluid. For these components, therefore, it is necessary to find suitable materials which have sufficient strength at the highest possible temperatures, and to develop methods by way of which cooling of these components is possible in order to permit the high temperatures to be employed.

In a gas turbine, the coolant necessary for the cooling is usually extracted, as cooling air, from a compressor coupled to the turbine. In order to keep the efficiency loss associated with this extraction of cooling air as small as possible, cooling concepts are intensively sought which ensure the most efficient possible employment of the coolant.

The U.S. Pat. No. 4,642,024 describes a coolable gas turbine engine stator group. The stator group has an outer air seal, together with an upstream restraint and a downstream restraint. The restraints support the outer air seal by means of hook arrangements along a flow path for working medium. This produces a design division of the air seal into three parts, into an upstream and a downstream boundary region and a central region arranged between the boundary regions. In order to cool the outer air seal with cooling air, impingement cooling takes place first in the central region. The boundary regions, which cannot be directly subjected to cooling air because of the restraints, are cooled by a part of the cooling air collected being guided through the restraints in order to permit impingement cooling of the boundary regions. For this purpose, metering holes extend through the restraints in order to guide the cooling air to the upstream and downstream boundary regions of the same outer air seal.

DE 197 33 148 C1 reveals a cooling appliance for cooling, by way of cooling air, a first stage of a gas turbine having a first guide blade and a first rotor blade. The first guide blade has a platform, which represents a wall element, which bounds the flow duct with a hot working fluid. A first chamber and a second chamber, which bounds it in the flow direction, are located on the platform of the first guide blade. A wall, which is inserted in the platform of the guide blade, is arranged between these two chambers. The first chamber is supplied with a first cooling air flow from a first cooling air supply system by way of a first cooling air supply line. The first cooling air flow is guided through the platform and released via the first stage of the gas turbine into the flow duct. The second chamber is correspondingly supplied with a second cooling air flow by a second cooling air supply system by way of a second cooling air supply line, which second cooling air flow is subsequently released through the platform into the first stage and into the flow duct. In this arrangement, the first cooling air supply system is operated with compressor outlet air with a first pressure whereas the second cooling air supply system is operated with compressor air from the compressor at a second pressure from an appropriate extraction point, the second pressure being lower than the first pressure. In this way, the guide blade is subjected to and cooled by independent coolant flows with different pressures.

The U.S. Pat. No. 4,177,004 describes a coolable guide blade cascade support structure of a first stage (inlet stage) of a turbine, in particular a gas turbine. A first guide blade with a blade platform and a guide ring are sequentially arranged on the guide blade cascade support structure, the guide blade ring being at an axial distance from the blade platform, thus forming a gap. During operation of the turbine, the blade platform and the guide ring form the outer boundary for a hot gas driving the rotor of the turbine. The arrangement is cooled by cooling air from a compressor connected upstream of the turbine, the guide blade, which is hollow on the inside, being first subjected to cooling air via the blade platform and, after the cooling of the internal space, the cooling air is released into the hot gas duct via outlet openings in the blade. A partial flow of cooling air is supplied from the blade platform to the guide ring for impingement cooling via an intermediate region which bridges over the gap. A large coolant requirement is indicated by the premature release of the coolant after the blade cooling and by the leakage losses due to the emergence of coolant through the gap into the hot gas duct.

SUMMARY OF THE INVENTION

The object of the invention is to provide a turbomachine with a coolable arrangement, having a first wall element and having a second wall element. This arrangement is, in particular, intended to improve the cooling efficiency. A second object of the invention is to provide a method of cooling an arrangement, having a first wall element and having a second wall element, in a turbomachine.

According to the invention, the object mentioned first is achieved by a turbomachine with a coolable arrangement, having a first wall element and having a second wall element, which bounds the first wall element along a longitudinal axis, each wall element having a wall with a first boundary region bounding the wall along the longitudinal axis and having a second boundary region, which is opposite to the first boundary region along the longitudinal axis, and having a hot surface, which can be exposed to a hot working fluid, and in which arrangement, a first cooling region, which faces away from the hot surface and which can be subjected to a coolant, is associated with the first wall element, and a second cooling region, which faces away from the hot surface, is associated with the second wall element, in which arrangement the first cooling region and the second cooling region have a flow connection with one another, in such a way that the coolant passes from the first cooling region into the second cooling region, while avoiding leakage losses.

The invention is based on consideration of the fact that a wall element in a turbomachine, which wall element is subjected to a hot working fluid, for example a hot gas or steam, is subjected to very severe thermal effects due to the temperature of the working fluid. In this arrangement, a wall element is used for bounding the space through which the hot working fluid flows. Using known cooling mechanisms, this wall element can be subjected to a coolant in a cooling region in order to cool the hot surface of the wall element which can be exposed to the hot working fluid. In the process, heat transfer occurs from the hot surface into the cooling region which faces away from the hot surface and in which the coolant absorbs the heat and removes it. In the process, the coolant is heated more or less strongly, depending on the cooling mechanism selected, the duration of the heat absorption by the coolant and the temperature difference between the hot surface and the coolant in the cooling region. In conventional designs, the temperature difference is only partially utilized for cooling purposes during the process because, for example, the coolant has already been released to the hot surface at comparatively low temperatures after the cooling of the wall element.

The invention pursues a new direction in order to efficiently use a coolant to cool an arrangement having a first wall element and having a second wall element, which bounds the first wall element. The result is the particular advantage of multiple utilization of the coolant for cooling different wall elements; this substantially reduces the employment of coolant in a turbomachine, as compared with previously known designs. Due to the multiple utilization of the coolant, the coolant is heated—as a result of the heat transfer in the different cooling regions—to higher temperatures than is the case with conventional embodiments and the heat content per coolant quantity employed is therefore increased. This avoids the loss of coolant between mutually bounding wall elements or as a result of premature release of the coolant to the hot surface of the arrangement.

The flow connection is preferably produced by a transition region, which comprises the second boundary region of the first wall element and the first boundary region, which bounds the first wall element axially, of the second wall element. The flow connection between the first cooling region and the second cooling region is therefore produced in the most direct possible way. This can, for example, be realized by a corresponding coolant passage, which extends from the first cooling region through the transition region into the second cooling region. The design as a coolant passage in the transition region provides, in particular, the advantage of a convective cooling effect over the whole of the transition region. At the same time, this ensures the most direct possible transfer of coolant from the first cooling region into the second cooling region so that the coolant is only slightly warmed in the transition region and is therefore available for further cooling purposes in the second cooling region. An advantageous feature is that only a small coolant pressure loss is associated with the flow connection on transfer from the first to the second cooling region.

The transition region preferably has a fit, in particular a seal, which substantially prevents the hot working fluid from passing into the first and second cooling regions and/or coolant from passing to the hot surface. An arrangement of the wall elements bounding one another axially, which is substantially impermeable to the hot working fluid, is realized by this design. This ensures that practically no hot working fluid is transferred from the hot surface of a wall element to the side of a wall element facing away from the hot surface. This has a favorable effect on the use of coolant and the cooling efficiency. In particular, this also protects other components which are located on the side of the arrangement facing away from the hot working fluid and which cannot be subjected to such severe thermal effects. In this arrangement, the fit can be realized by appropriate design of the second boundary region of the first wall element and the first boundary region, which bounds the first wall element axially, of the second wall element. A possible design is also provided by a metal sealing element which engages in mutually opposite grooves in the boundary regions, which bound one another, of the adjacent wall elements. The fit reduces the loss of coolant, due to leakage losses, between mutually bounding wall elements or due to premature release of the coolant to the hot surface of the arrangement. The structural design of the fit and the selection of the pressure of the coolant in the cooling regions of the arrangement achieves the effect that the pressure difference between the coolant and the hot working fluid is adequately low but sufficiently high to achieve a barrier air effect relative to the hot working fluid. For this purpose, the coolant pressure present in the cooling regions must be only slightly above the local pressure of the hot working fluid. As the fit is made tighter, the leakage losses at this location become smaller.

The first cooling region preferably comprises an impingement cooling region. Impingement cooling or impact cooling is one of the more effective techniques used for cooling purposes in a turbomachine. In this cooling method, a coolant is usually guided through a plurality of openings in a plate (impingement cooling plate) which is adjacent to the surface to be cooled. In consequence, the coolant impinges in a corresponding plurality of coolant jets essentially at right angles to the surface to be cooled in the impingement cooling region. During the interaction with the surface to be cooled, the coolant absorbs heat which, because of the heat transfer from the hot surface of the wall element subjected to the hot working fluid, is transported into the impingement cooling region facing away from the hot surface, and becomes hotter in the process. The cooling efficiency in the case of impingement cooling is higher than it is, for example, in the case of conventional convection cooling, in which the coolant is guided essentially parallel to a surface which has to be cooled. Carrying out impingement cooling in the impingement cooling region achieves very effective cooling of the first wall element. The wall element can, by this means, be subjected to higher temperatures of the hot working fluid because, given the same heat input into the wall element, the latter can be kept to a lower material temperature relative to other cooling methods.

The second cooling region preferably comprises an impingement cooling region and a deflection region, for coolant, connected upstream of the impingement cooling region. By this means, the second wall element can also be efficiently cooled by means of impingement cooling in a manner analogous to that described above. In this arrangement, the deflection region is used for guiding the flow of the coolant for impingement cooling in the second cooling region. For this purpose, the deflection region is, for example, equipped with a suitable deflection plate which, as far as possible, deflects the coolant flow into a direction at right angles to the surface to be cooled in the impingement cooling region.

The second cooling region preferably comprises a convection cooling region, which is arranged axially downstream of the impingement cooling region. The convection cooling region permits further use of the coolant for the convective cooling of the second wall element. In the case of the convection cooling, the wall of the hollow internal wall element forms the separating wall between the coolant and the hot working fluid. In this cooling method, the coolant is guided essentially parallel to the wall, i.e. along a surface which has to be cooled. The design of this can be such that the coolant is guided through a plurality of convection cooling ducts in the wall.

The convection cooling region preferably has a coolant outlet, which extends through the second boundary region of the second wall element into the hot surface. Following the convection cooling in the convection cooling region, it is therefore possible to release the coolant to the hot surface of the wall element. This coolant outlet can, for example, be configured as a duct or hole which opens into the hot surface of the wall element at the most acute angle possible. This provides the possibility of film-cooling a further wall element, which is arranged axially downstream of the second wall element and bounds the latter. Corresponding structural design of the coolant outlet achieves a retardation (diffuser effect) of the coolant flow emerging onto the hot surface and this greatly favors the formation of a film for film cooling. In this arrangement, the outlet flow direction of the coolant should be as tangential as possible relative to the hot surface of the wall element. The coolant outlet designed in this way ensures good formation of a cooling film and an effective continuation and propagation of a cooling film along the hot surface of a further wall element which bounds the second wall element axially. Advantageously, the coolant also serves the corrosion protection of the hot surface of the further wall element, provided the coolant completely covers the hot surface as a flat cooling film and, in consequence, a continuous protective film is present for thermal protection purposes.

In a preferred design, the second cooling region comprises a convection cooling region. The convection cooling region can, in particular, extend over almost the whole of the second cooling region.

The first wall element and/or the second wall element is preferably a platform of a turbine guide blade or is a guide ring. The platform of a turbine guide blade is used for fixing the turbine guide blade on the inner turbine casing. The platform in this arrangement represents a wall element with a hot surface and bounds a flow of hot working fluid, for example a hot gas or steam. A guide ring is arranged as a wall element in a turbomachine between the platform of two turbine guide blades at an axial distance from one another. The guide ring has a hot surface, which can be exposed to the hot working fluid and which, by means of a gap, is at a distance in the radial direction from the outer ends of the turbine rotor blades.

In a preferred embodiment, the first wall element is a platform of a turbine guide blade and the second wall element bounding it axially is a guide ring. Because of the greater heat transfer from the hot working fluid into the blade aerofoil and the thermal conduction from the blade aerofoil into the platform, the platform of the turbine guide blade, which is arranged before the guide ring, is subjected to more severe thermal effects than the guide ring. It is therefore advantageous to employ the coolant first for cooling the platform of the turbine guide blade. The guide ring which bounds the platform axially then preferably has a coolant outlet which permits film cooling of the hot surface of a wall element arranged axially downstream of the guide ring, for example a platform of a further turbine guide blade.

The object directed towards a method is achieved, according to the invention, by a method of cooling an arrangement having a first wall element and having a second wall element, which bounds the first wall element along a longitudinal axis, in a turbomachine, in which arrangement each wall element has a hot surface which can be exposed to a hot working fluid, and a first cooling region, which faces away from the hot surface, is associated with the first wall element and a second cooling region, which faces away from the hot surface, is associated with the second wall element, and in which a coolant is supplied to the first cooling region and the first wall element is impingement-cooled by a coolant in the first cooling region, in which arrangement, after the impingement cooling in the first cooling region, the coolant is used for cooling the second wall element in the second cooling region, while avoiding leakage losses.

After the cooling of a first wall element in a first cooling region (impingement cooling), a coolant preferably is further used for cooling a second wall element in a second cooling region. By this means, the loss of coolant between mutually bounding wall elements or because of premature release of the coolant to the hot surface of the arrangement is avoided. As compared with conventional methods, in which different coolant flows are used for cooling different wall elements, this method achieves a substantially lower consumption of coolant and, in consequence, a higher efficiency. In this arrangement, the first wall element is cooled in the first cooling region by means of impingement cooling and, by this means, is kept to a maximum material temperature which is lower than the temperature of the hot working fluid. In the first cooling region, heat is transferred to the coolant and, in consequence, the latter is heated.

In the case of turbomachines, in particular in the case of gas turbines, the increase in temperature of the coolant as a consequence of impingement cooling is, for example, between approximately 50° C. and 150° C. The coolant heated in this way is subsequently further used for cooling purposes in the second cooling region, it being possible to utilize various cooling mechanisms. In conventional methods, in contrast, no provision is made for the cooling of a second wall element in a second cooling region. After impingement cooling of a wall element has taken place in these methods, the coolant is usually led directly to the hot surface of the wall element through coolant passages. It is there released at a temperature which is relatively low as compared with the temperature of the hot working fluid. The coolant released can still be used, however, for film-cooling on the hot surface.

By means of the method, the temperature difference which is present between the hot working fluid and the coolant is utilized in the best possible way for the removal of heat. Due to the multiple utilization of the coolant, the coolant is brought to a distinctly higher temperature, as compared with other methods, so that the heat removal is correspondingly higher in terms of the coolant employed. The cooling method is particularly important in all applications which concern the cooling and the efficient employment of coolant in a turbomachine.

In addition to its use for cooling the blading in a turbomachine, in particular in a gas turbine, coolant—for example cooling air—is used as so-called barrier air for cooling components of the turbine rotor and for cooling the stationary hot components within the hot gas duct. These cooling air quantities, which are usually extracted from a compressor connected upstream of the turbine, only partially perform expansion work in the turbine, namely to the extent that they can be mixed into the flow of hot working fluid.

Depending on the level of the turbine inlet temperature and the size of the installation, a cooling air consumption of approximately 7% (800° C.) to 13% (1200° C.) of the air quantity induced by the compressor can be expected. In the case of small installations, these percentage figures are increased by, approximately, a further 3% and in the case of very large stationary installations, they are approximately 3% smaller. Because of this, approximately 2% (at 800° C.) to 3.5% (at 1200° C.), depending on the turbine inlet temperature, of the air quantity induced by the compressor does not participate in the expansion work. In consequence, multiple utilization of the coolant, as provided by the method, acts directly on the total coolant consumption and therefore favorably on the efficiency of a turbomachine.

After the impingement cooling in the first cooling region, the flow of the coolant is preferably guided for impingement cooling in the second cooling region. As already described in more detail in the appliance part, impingement cooling represents a very efficient cooling method. For this reason, impingement cooling is preferably carried out in the second cooling region. For the impingement cooling in the second cooling region, the flow of the coolant is initially guided in a suitable manner, i.e. it is deflected in such a way that efficient impingement cooling is possible. For this purpose, a deflection plate, for example, is provided in the deflection region, which deflection plate deflects the flow of coolant as far as possible into a direction at right angles to the surface to be cooled in the impingement cooling region. As a consequence of the impingement cooling in the second cooling region, heat is effectively transported out of the second wall element and the coolant is heated to a temperature between approximately 50° C. and 150° C.

In the second cooling region, the coolant is preferably further used for convective cooling after the impingement cooling. Subsequent to the impingement cooling in the second cooling region, the coolant is further used for cooling the second wall element by utilizing other cooling mechanisms. The method provides for convective cooling in this case. The second cooling region therefore comprises a convection cooling region in which the convective cooling is carried out. During the convective cooling, the flow of coolant is, for example, guided through one or a plurality of coolant ducts which are formed in the convection cooling region. The heat transfer takes place from the hot surface of the wall element subjected to a hot working fluid and into the convection cooling region where the coolant absorbs the heat. In this arrangement, the increase in temperature of the coolant as a consequence of the convective cooling is between approximately 20 and 60° C.

The coolant is preferably released to the hot surface of the second wall element. After the release of the coolant from the arrangement, the method provides for the further use of the coolant for film-cooling the hot surface of the second wall element or the hot surface of a further wall element axially adjacent to the second wall element. For this purpose, the outlet direction of the coolant should be as tangential as possible to the hot surface of the second wall element. A coolant outlet designed for this purpose ensures a satisfactory formation of a cooling film and an effective continuation and propagation of a cooling film along the hot surface. During the film cooling, the cooling film also undertakes the corrosion protection of the hot surface, provided the coolant flow completely covers the hot surface as a continuous protective film. Because the effectiveness of the film cooling is only slightly reduced with increasing temperature, a very advantageous sequence and utilization of the cooling mechanisms given is provided by the method.

The coolant is preferably heated in the arrangement from a supply temperature to an outlet temperature, in which arrangement the supply temperature is between approximately 150° C. and 500° C., in particular between approximately 250° C. and 450° C. The outlet temperature is further preferably between approximately 350° C. and 850° C., in particular between approximately 500° C. and 700° C.

BRIEF DESCRIPTION OF THE DRAWINGS

The turbomachine with a coolable arrangement of wall elements and the method of cooling an arrangement of wall elements in a turbomachine by means of a coolant are explained in more detail, as an example, by means of the embodiment examples shown in the drawing. In part diagrammatic and simplified.

The same designations have the same significance in each of the figures.

DETAILED DESCRIPTION OF THE PREFERRED EMBODIMENTS

Figure 1:
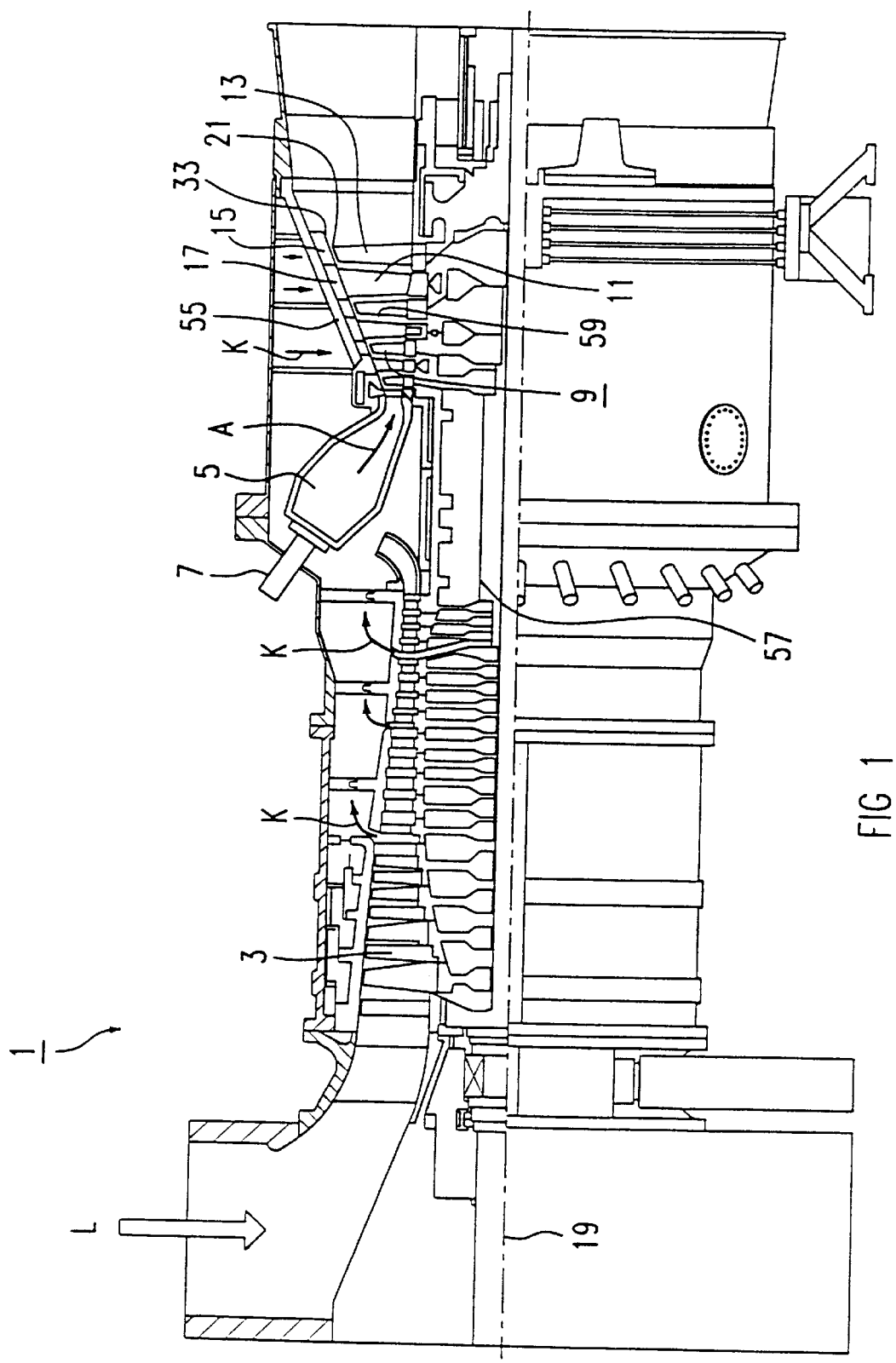
FIG. 1 shows a half-section through a gas turbine with compressor, combustion chamber and turbine.

FIG. 1 shows a half-section through a gas turbine 1. The gas turbine 1 has a compressor 3 for combustion air, a combustion chamber 5 with burner 7 for a liquid or gaseous fuel and a turbine 9 for driving the compressor 3 and a generator (not shown in FIG. 1). Stationary guide blades 11 and rotating rotor blades 13 are arranged in the turbine 9 in respective rings, which extend radially and are not shown in the half-section, along the axis of rotation 19 of the gas turbine 1. In the figure, a pair, which follows sequentially along the axis of rotation 19 and include a ring of guide blades 11 (guide blade ring) and a ring of rotor blades 13 (rotor blade ring), is designated as a turbine stage. Each guide blade 11 has a platform 17, which is arranged on the inner turbine casing 55 for fixing the respective guide blade 11. In this arrangement, the platform 17 represents a wall element in the turbine 9. The platform 17 is a component which is subjected to severe thermal effects and forms the outer boundary of a hot working fluid A, in particular the hot gas duct 59 in the turbine 9. The rotor blade 13 is fastened to the turbine rotor 57 arranged along the axis of rotation 19 of the gas turbine 1.

A guide ring 15 is arranged as a wall element in a gas turbine 1 between the platform 17 of two adjacent guide blades 11 at an axial distance from one another. The guide ring 15 and the platform 17 of the guide blade 11 each have a hot surface 33 which is exposed to the hot working fluid A, in particular the hot gas, during operation of the gas turbine. In this arrangement, the hot surface 33 of the guide ring 15 is, due to a gap, at a distance in the radial direction from the outer end 21 of the rotor blade 13. The platform 17 of the guide blade 11 and the guide ring 15 bounding it axially are each coolable wall elements which are subjected, for cooling purposes, to a coolant K. During operation of the gas turbine 1, fresh air L is induced from the surroundings. The air L is compressed in the compressor 3 and is, by this means, preheated at the same time. The air L is brought together with the liquid or gaseous fuel and burnt in the combustion chamber 5. A part of the air L, which has been previously extracted from the compressor 3 through suitable extraction points, is used as the cooling air K for cooling the turbine stages, the first turbine stage being, for example, subjected to a turbine inlet temperature of approximately 750° C. to 1200° C. Expansion and cooling of the hot working fluid A, in particular the hot gas which flows through the turbine stages, takes place in the turbine 9.

Figure 2:
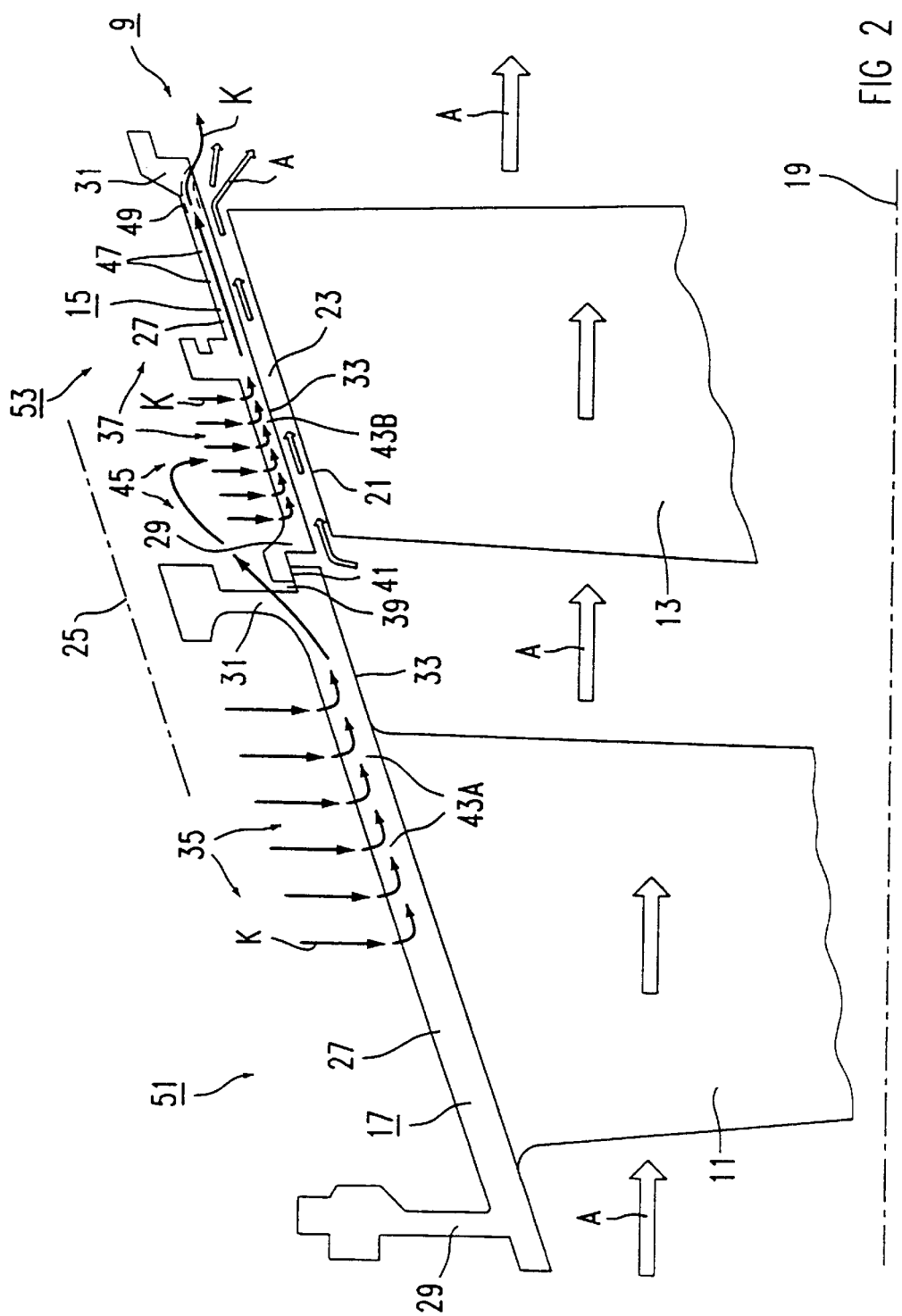
FIG. 2 shows a longitudinal section through an excerpt of a turbine with a cooling system according to the invention.

FIG. 2 shows, in a longitudinal section, a section from the turbine 9 shown in FIG. 1. A turbine guide blade 11 and a turbine rotor blade 13 are arranged in sequence along the axis of rotation 19 of the turbine 9. The turbine guide blade 11 has a platform 17, designated below as the first wall element 51. A guide ring 15, designated below as the second wall element 53, bounds the first wall element 51 along a longitudinal axis 25. The wall elements 51, 53 have respective walls 27 which are bounded by a first boundary region 29 along the longitudinal axis 25 and a second boundary region 31, opposite to the first boundary region 29, along the longitudinal axis 25.

Each of the wall elements 51, 53 has a hot surface 33, which can be exposed to a hot working fluid A, for example a hot gas or steam. A first cooling region 35, which faces away from the hot surface 33, is associated with the first wall element 51 and a second cooling region 37, which faces away from the hot surface 33, is associated with the second wall element 53. The first cooling region 35 and the second cooling region 37 are in flow connection with one another so that a coolant K passes from the first cooling region 35 into the second cooling region 37. The flow connection is produced by a transition region 39, in which arrangement the second boundary region 31 of the first wall element 51 and the first boundary region 29, axially bounding the first wall element 51, of the second wall element 53 overlap. The transition region 39 has a fit 41, which substantially prevents the hot working fluid A from passing into the first and second cooling regions 35, 37 and/or the coolant K from passing to the hot surface 33 of the arrangement 51, 53 at this location. The fit 41 is produced by the boundary regions 31, 29, which bound one another along the longitudinal axis 25, of the first wall element 51 and the second wall element 53. Alternative designs, for example in the form of a metal sealing element which engages in opposing grooves in the boundary regions 31, 29, can likewise be realized.

The first cooling region 35 comprises an impingement cooling region 43A. The second cooling region 37 comprises an impingement cooling region 43B and a deflection region 45, connected upstream of the impingement cooling region 43B, for coolant K. The first and the second cooling regions 35, 37 can be respectively subjected to a coolant K for impingement cooling in the associated impingement cooling regions 43A, 43B. The second cooling region 37 comprises a convection cooling, region 47, which is arranged downstream of the impingement cooling region 43B along the longitudinal axis 25.

The convection cooling region 47 extends along the longitudinal axis 25 so that a coolant K is guided along the wall 27 of the second wall element 53 in a flow direction from the first boundary region 29 to the second boundary region 31. The convection cooling region 47 has a coolant outlet 49, which extends through the second boundary region 31 of the second wall element 53 into the hot surface 33. During operation of the turbine 9, the hot working fluid A, for example a hot gas or steam, flows along the axis of rotation 19 and produces expansion work at the guide blade 11 and the rotor blade 13. A relatively small part of the hot working fluid A flows through the gap 23 formed between the hot surface 33 of the second wall element 53 and the outer end 21 of the rotor blade 13. This proportion produces no work on the rotor blade 13 and is therefore designated as gap loss.

The arrangement 51, 53 is cooled, according to the cooling method, as follows. A coolant K, preferably cooling air from a suitable extraction point of a compressor 3 connected upstream of the turbine 9 and not shown in FIG. 2 (see FIG. 1) is supplied to the first cooling region 35. The first wall element 51 is subjected to, and impingement cooled by, the coolant K in the impingement cooling region 43A.

The coolant K is heated as a consequence of the impingement cooling. Subsequent to the impingement cooling in the first cooling region 35, the coolant K is further used for cooling the second wall element 53 in the second cooling region 37. For this purpose, the coolant K first flows through the transition region 39, which produces the flow connection between the first cooling region 35 and the second cooling region 53. Convective cooling occurs in the transition region 39 because the coolant is guided from the first cooling region 35 through the second boundary region 31 of the first wall element 51. The coolant K further heated in this way is subsequently deflected in the deflection region 45 so that the flow direction is adjusted, as far as possible, at right angles to the wall 27 of the second wall element 53. This permits efficient impingement cooling in the impingement cooling region 43B of the second cooling region 37. The coolant K is further heated as a consequence of the impingement cooling. After the impingement cooling, the coolant K is used for convective cooling in the second cooling region 37. For this purpose, the coolant K flows through the convective cooling region 47, which is arranged axially downstream of the impingement cooling region 43B. The coolant K, which has been further heated by the convective cooling, is finally released to the hot surface 33 of the second wall element 53. It is there further used for film cooling the hot surface 33 of the second wall element 53 or, preferably, is subsequently further used for film cooling the hot surface of a further wall element, which is not shown in FIG. 2 and which axially bounds the second wall element 53.

In a preferred design of this arrangement, the further wall element is a platform 17 of a guide blade 11 (see FIG. 1). In the case of the film cooling, a cooling film formed by the coolant K is formed along the hot surface 33. The cooling film protects the further wall element from the severe thermal and corrosive effects due to the hot working fluid A. This cooling film fulfills its function until such times as it separates or is eddied. The cooling efficiency of this cooling film in this arrangement becomes more effective as the outlet flow direction of the coolant K agrees better with the flow direction of the hot working fluid A, for example the hot gas or steam. In the method, the coolant K is employed for cooling different cooling regions 35, 37 of different wall elements 53, 51. In this arrangement, different cooling mechanisms, which are carried out in sequence, are applied. In consequence, the coolant K is heated successively.

Figure 3:
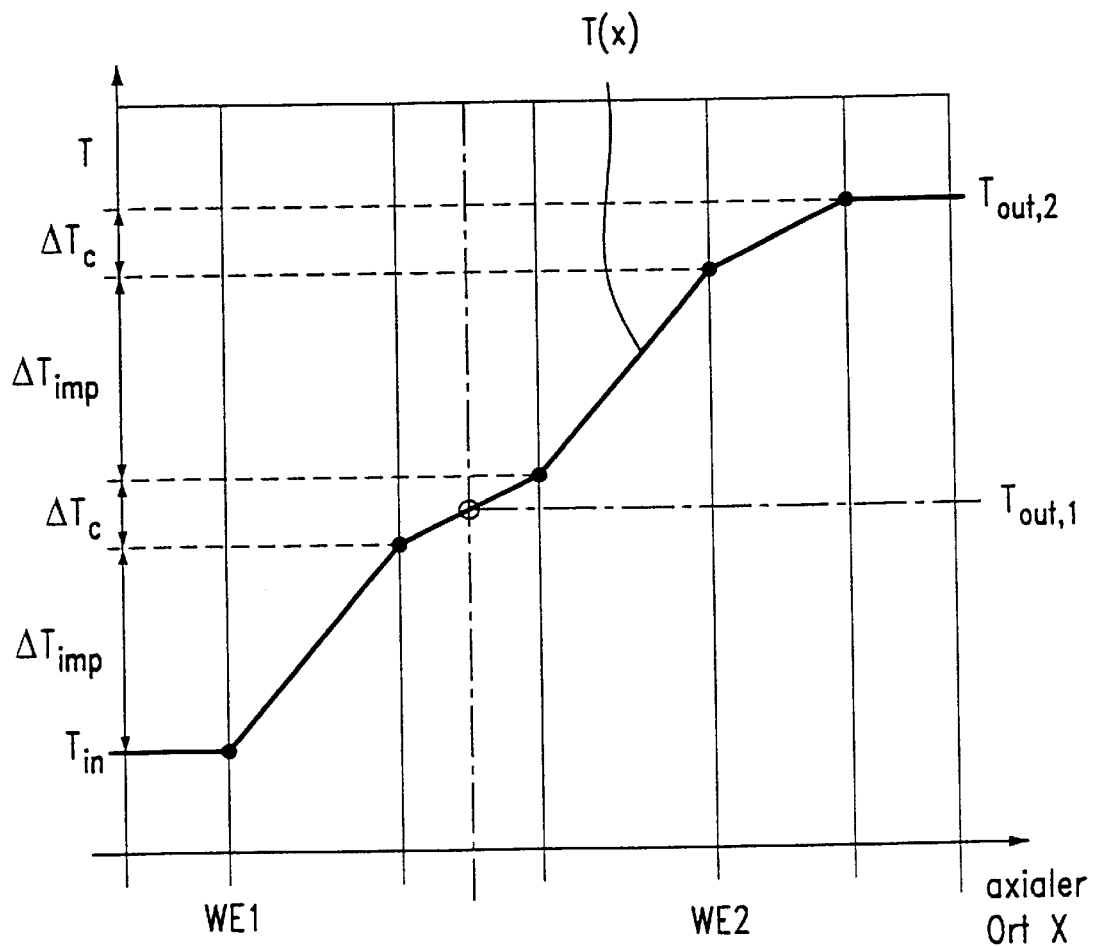
FIG. 3 shows, for the method according to the invention, a diagram with a simplified temperature variation for a coolant.

The temperature variation for the coolant K in the case of the method is shown qualitatively in FIG. 3 by means of a diagram. The axial location at which the coolant is located is plotted on the X axis of the diagram. The coolant temperature T, which the coolant has at a certain location, is plotted on the Y axis of the diagram. The coolant temperature T is illustrated, as a function of the location, as a curve T(x) in the diagram. The wall elements 51, 53, which bound one another axially (see FIG. 2), are designated on the X axis of the diagram by the regions WE1 and WB2. The coolant K is first supplied to the first cooling region 35 at a supply temperature of $T_{in}$. In this arrangement, the supply temperature $T_{in}$ is between approximately 150° C. and 500° C., in particular between approximately 250° C. and 450° C.

As a consequence of the impingement cooling in the first cooling region 35, the coolant K is heated by an impingement cooling temperature rise of $\Delta T_{imp}$. The impingement cooling temperature rise $\Delta T_{imp}$ is between approximately 50 and 150° C. After the impingement cooling in the first cooling region 35, the flow of the coolant K is guided from the first cooling region 35 into the second cooling region 37. This flow guidance is associated with convective cooling.

As a consequence of the convective cooling, the coolant K is heated by a convection temperature rise $\Delta T_c$, which is between approximately 20 and 60° C. After the convection cooling, the coolant K is used for renewed impingement cooling, which is carried out in the second cooling region 37. The impingement cooling is used for cooling the second wall element WE2 and leads in turn to an impingement cooling temperature rise $\Delta T_{imp}$ of the coolant K. Subsequent to this, the coolant K is further used for convection cooling. As a consequence of this, the coolant K is again heated by a temperature difference which is equal to the convection temperature rise $\Delta T_c$.

The coolant K is subsequently released from the arrangement WE1, WE2. In this arrangement, the coolant K has an outlet temperature $T_{out,2}$ which is between approximately 350° C. and 850° C., in particular between approximately 500° C. and 700° C.

In conventional cooling methods, the coolant has, in contrast, already been released after the impingement cooling and, if appropriate, after convection cooling of a first wall element WE1. The outlet temperature $T_{out,1}$ associated with this is distinctly less than the outlet temperature $T_{out,2}$ according to the method. In the method, therefore, the heat capacity of the coolant K is more efficiently utilized. The coolant K is brought to a higher temperature because it is employed for further cooling purposes. In terms of the quantity of coolant K employed, the heat removal from the arrangement WE1, WE2 is, in consequence, markedly increased in the case of the method. An increase in the efficiency of the turbomachine is associated with this increase in the cooling efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus with a coolable arrangement, comprising:
   a first wall element; and
   a second wall element, which bounds the first wall element along a longitudinal axis, each wall element including,
   a) a wall including, a first boundary region bounding the wall along the longitudinal axis and including a second boundary region, opposite to the first boundary region along the longitudinal axis, and
   b) a hot surface, exposable to a hot working fluid, wherein a first cooling region, facing away from the hot surface and subjectable to a coolant, is associated with the first wall element, and a second cooling region, facing away from the hot surface, is associated with the second wall element, and wherein the first cooling region and the second cooling region include a flow connection with one another, in which arrangement, the second boundary region of the first wall element and the first boundary region of the second wall element, which region axially bounds the first wall element, overlap in such a way that the coolant passes from the first cooling region into the second cooling region, while avoiding leakage losses.

2. The apparatus as claimed in claim 1, wherein the flow connection is produced by a transition region, which includes the second boundary region of the first wall element and the first boundary region, which axially bounds the first wall element, of the second wall element.

3. The apparatus as claimed in claim 2, wherein the transition region includes a fit which prevents at least one of the hot working fluid from passing into the first and the second cooling regions and coolant from passing to the hot surface.

4. The apparatus as claimed in claim 3, wherein the fit is a seal.

5. The apparatus as claimed in claim 3, wherein the first cooling region includes an impingement cooling region.

6. The apparatus as claimed in claim 1, wherein the first cooling region includes an impingement cooling region.

7. The apparatus as claimed in claim 6, wherein the second cooling region includes an impingement cooling region and a deflection region, for coolant, connected upstream of the impingement cooling region.

8. The apparatus as claimed in claim 1, wherein the second cooling region includes an impingement cooling region and a deflection region, for coolant, connected upstream of the impingement cooling region.

9. The apparatus as claimed in claim 8, wherein the second cooling region includes a convection cooling region, which is arranged axially downstream of the impingement cooling region.

10. The apparatus as claimed in claim 9, wherein the convection cooling region includes a coolant outlet, which extends through the second boundary region of the second wall element into the hot surface.

11. The apparatus as claimed in claim 1, wherein the second cooling region includes a convection cooling region.

12. The apparatus as claimed in claim 1, wherein the first wall element and the second wall element is a platform of a turbine guide blade.

13. The apparatus as claimed in claim 1, wherein the first wall element and the second wall element is a platform of a guide ring.

14. The apparatus of claim 1, wherein the apparatus is a turbomachine.

15. A turbine including the apparatus of claim 1.

16. The turbine of claim 15, wherein platforms of a pair of blades of the turbine respectively include the first and second wall elements.

17. The turbine of claim 15, wherein a platform of a guide blade of the turbine includes the first wall element and wherein a platform of a rotor blade of the turbine includes the second wall element.

18. A gas turbine including the apparatus of claim 1.

19. The gas turbine of claim 18, wherein platforms of a pair of blades of the turbine respectively include the first and second wall elements.

20. The gas turbine of claim 18, wherein a platform of a guide blade of the turbine includes the first wall element and wherein a platform of a rotor blade of the turbine includes the second wall element.

21. A turbo-machine including the apparatus of claim 1.

22. The turbo-machine of claim 21, wherein platforms of a pair of blades of the turbine respectively include the first and second wall elements.

23. The turbo-machine of claim 21, wherein a platform of a guide blade of the turbine includes the first wall element and wherein a platform of a rotor blade of the turbine includes the second wall element.

24. A method of cooling an arrangement for an apparatus including a first wall element and a second wall element, which bounds the first wall element along a longitudinal axis, in which arrangement each wall element includes a hot surface exposable to a hot working fluid, and a first cooling region, which faces away from the hot surface, associated with the first wall element and a second cooling region, which faces away from the hot surface, associated with the second wall element, the method comprising:

a) supplying a coolant to the first cooling region,
  b) impingement-cooling the first wall element by the coolant in the first cooling region, wherein, after the impingement cooling in the first cooling region, the coolant is used for cooling the second wall element in the second cooling region, while avoiding leakage losses.

25. The method as claimed in claim 24, wherein after the impingement cooling in the first cooling region, the flow of the coolant is guided for impingement cooling in the second cooling region.

26. The method as claimed in claim 25, wherein in the second cooling region, the coolant is further used for convective cooling after the impingement cooling.

27. The method as claimed in claim 26, wherein the coolant is released to the hot surface of the second wall element.

28. The method as claimed in claim 26, wherein the coolant is heated in the arrangement from a supply temperature to an outlet temperature, in which arrangement the supply temperature is between approximately 150° C. and 500° C.

29. The method as claimed in claim 28, wherein the coolant is heated in the arrangement from a supply temperature to an outlet temperature, in which arrangement the supply temperature is between approximately 250° C. and 450° C.

30. The method as claimed in claim 25, wherein the coolant is released to the hot surface of the second wall element.

31. The method as claimed in claim 25, wherein the coolant is heated in the arrangement from a supply temperature to an outlet temperature, in which arrangement the supply temperature is between approximately 150° C. and 500° C.

32. The method as claimed in claim 31, wherein the coolant is heated in the arrangement from a supply temperature to an outlet temperature, in which arrangement the supply temperature is between approximately 250° C. and 450° C.

33. The method as claimed in claim 24, wherein the coolant is released to the hot surface of the second wall element.

34. The method as claimed in claim 33, wherein the coolant is heated in the arrangement from a supply temperature to an outlet temperature, in which arrangement the supply temperature is between approximately 150° C. and 500° C.

35. The method as claimed in claim 34, wherein the coolant is heated in the arrangement from a supply temperature to an outlet temperature, in which arrangement the supply temperature is between approximately 250° C. and 450° C.

36. The method as claimed in claim 24, wherein the coolant is heated in the arrangement from a supply temperature to an outlet temperature, in which arrangement the supply temperature is between approximately 150° C. and 500° C.

37. The method as claimed in claim 36, wherein the outlet temperature is between approximately 350° C. and 850° C.

38. The method as claimed in claim 36, wherein the outlet temperature is between approximately 500° C. and 700° C.

39. The method as claimed in claim 24, wherein the coolant is heated in the arrangement from a supply temperature to an outlet temperature, in which arrangement the supply temperature is between approximately 250° C. and 450° C.

40. The method as claimed in claim 39, wherein the outlet temperature is between approximately 350° C. and 850° C.

41. The method as claimed in claim 40, wherein the outlet temperature is between approximately 500° C. and 700° C.

42. The method of claim 24, wherein the method is for cooling an arrangement for a turbomachine.

43. A turbine, comprising:

a first blade including a first cooling region; and
  a second blade including a second cooling region, wherein each of the first and second blade is exposable to a relatively hot fluid on a first side thereof and is subjectable to a coolant on a second side thereof, and wherein the first and second cooling region are in flow connection with one another such that coolant passes from the first cooling region to the second cooling region and reduces leakage losses.

44. The turbine of claim 43, wherein at least one of the first and second blades is a rotor blade.

45. The turbine of claim 43, wherein the first and second cooling regions are respectively in a platform of the first and second blades.

46. The turbine of claim 43, wherein a transition region, formed at a boundary of the first and second cooling regions, is adapted to limit relatively hot fluid from passing into the first and second cooling region and to limit coolant from passing into the hot fluid.

47. The turbine of claim 46, wherein the transition region includes a fit.

48. The turbine of claim 46, wherein the transition region includes a seal.

49. The turbine of claim 43, wherein the turbine is a gas turbine.

* * * * *